United States Patent
Lovicott et al.

(10) Patent No.: US 10,642,326 B2
(45) Date of Patent: May 5, 2020

(54) MAPPED FAN ZONE COOLING SYSTEM

(71) Applicant: Dell Products L.P., Round Rock, TX (US)

(72) Inventors: Dominick Adam Lovicott, Round Rock, TX (US); Paul Theodore Artman, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 229 days.

(21) Appl. No.: 15/146,716

(22) Filed: May 4, 2016

(65) Prior Publication Data
US 2016/0282917 A1 Sep. 29, 2016

Related U.S. Application Data

(63) Continuation of application No. 13/344,454, filed on Jan. 5, 2012, now Pat. No. 9,360,904.

(51) Int. Cl.
*G06F 1/20* (2006.01)
*G05B 15/02* (2006.01)

(52) U.S. Cl.
CPC .............. *G06F 1/206* (2013.01); *G05B 15/02* (2013.01); *G06F 1/20* (2013.01); *Y02D 10/16* (2018.01)

(58) Field of Classification Search
CPC ........... G05B 15/02; G06F 1/20; G06F 1/206; Y02D 10/16
USPC ........................................................ 700/299
See application file for complete search history.

(56) References Cited

U.S. PATENT DOCUMENTS

| | | | |
|---|---|---|---|
| 6,188,189 B1 | 2/2001 | Blake | |
| 6,247,898 B1 | 6/2001 | Henderson et al. | |
| 6,257,832 B1 * | 7/2001 | Lyszkowski | F04D 29/661 361/695 |
| 6,396,688 B1 * | 5/2002 | Davies | G06F 1/20 361/51 |
| 6,428,282 B1 * | 8/2002 | Langley | F04D 27/004 417/2 |
| 6,487,463 B1 * | 11/2002 | Stepp, III | G05D 23/1934 700/299 |
| 6,961,242 B2 | 11/2005 | Espinoza-Ibarra et al. | |
| 7,295,897 B2 | 11/2007 | Marando et al. | |
| 7,505,266 B2 | 3/2009 | Sanchez et al. | |
| 7,708,056 B2 | 5/2010 | Shen et al. | |

(Continued)

OTHER PUBLICATIONS

Paul T. Artman and Chris Everett Peterson;"Methods for Managing Fans Within Information Handling Systems;" U.S. Appl. No. 13/041,375; filed Mar. 5, 2011; 36 Pages.

*Primary Examiner* — Michael J Huntley
(74) *Attorney, Agent, or Firm* — Haynes and Boone, LLP

(57) ABSTRACT

A cooling system includes a chassis. A thermal sensor is located in the chassis. A plurality of fan zones are located in the chassis. Each of the plurality of fan zones includes at least one fan. A first mapping is provided between the thermal sensor and a first fan zone of the plurality of fans zone, and a second mapping is provided between the first fan zone and a second fan zone in the plurality of fan zones. A controller is coupled to the thermal sensor and the at least one fan in each of the plurality of fan zones. In response to receiving a signal from the thermal sensor, the controller is operable to activate the at least one fan in the first fan zone according to the first mapping and activate the at least one fan in the second fan zone according to the second mapping.

20 Claims, 8 Drawing Sheets

(56) References Cited

U.S. PATENT DOCUMENTS

| | | |
|---|---|---|
| 7,742,844 B2 | 6/2010 | Coxe, III |
| 8,849,463 B2 * | 9/2014 | Hopkins ............... F04D 25/166 |
| | | 700/276 |
| 2008/0310967 A1 * | 12/2008 | Franz .................... F04D 27/004 |
| | | 417/32 |
| 2009/0265045 A1 * | 10/2009 | Coxe, III ................. G06F 1/20 |
| | | 700/300 |
| 2009/0304199 A1 * | 12/2009 | DeMoss .................... G06F 1/20 |
| | | 381/71.1 |
| 2011/0035606 A1 | 2/2011 | Lovicott et al. |
| 2011/0051357 A1 * | 3/2011 | Orr ........................... G06F 1/20 |
| | | 361/679.48 |
| 2011/0144825 A1 | 6/2011 | Yamasaki |
| 2012/0112678 A1 * | 5/2012 | Huang ................. F04D 27/004 |
| | | 318/471 |
| 2012/0123597 A1 | 5/2012 | Cepulis et al. |
| 2012/0166015 A1 | 6/2012 | Steinbrecker et al. |
| 2013/0098593 A1 | 4/2013 | Busch et al. |
| 2013/0158713 A1 | 6/2013 | Geissler et al. |
| 2013/0176680 A1 | 7/2013 | Lovicott et al. |

\* cited by examiner

MAPPED FAN ZONE COOLING SYSTEM

CROSS-REFERENCE TO RELATED APPLICATIONS

This is a Continuation application to U.S. Utility application Ser. No. 13/344,454 filed Jan. 5, 2012, entitled "MAPPED FAN ZONE COOLING SYSTEM," the disclosure of which is incorporated herein by reference in its entirety.

BACKGROUND

The present disclosure relates generally to information handling systems, and more particularly to a mapped fan zone cooling system in an IHS.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

As IHSs become more powerful, the cooling system in the IHS utilizes more and more power in order to cool the IHS components of the IHS. In an attempt to make these cooling systems more efficient, IHS components may be associated or 'mapped' to a fan which may be located adjacent the mapped IHS component. The mapping of an IHS component to a fan results in only that fan being operated when the IHS component needs to be cooled, which saves power relative to systems that activate all the fans in the IHS when an IHS component needs cooling. However, such conventional IHS component/fan mapping suffers from several disadvantages.

For example, with an IHS component mapped to a fan, that IHS component is typically only cooled by increasing the fan speed for that fan. This has been found to limit local airflow potential and result in high power consumption by the fan, as fan power consumption is a cubic of fan speed. Furthermore, while maximum total airflow may be achieved by operating all the fans in the IHS at full speed, local maximum airflow is not always achieved in the same manner (i.e., with the mapped fan operating at full speed.) Thus, in some situations the fan that is mapped to an IHS component may not be able to properly cool the IHS component, and in order to meet the IHS component thermal requirements it may be necessary to then operate all the fans in the IHS at full speed, which is inefficient in terms of power consumption. Further still, there are instances where mapping IHS components to respective fans will cause changes in the airflow balance in regions of the IHS such that airflow in regions of the IHS may become negative, positive, or stagnant depending on fan speed differences in the rear and mid-chassis fans, the system fans, the Power Supply Unit (PSU) fans, and/or other fans in the system.

Accordingly, it would be desirable to provide an improved cooling system.

SUMMARY

According to one embodiment, a cooling system includes a chassis, a thermal sensor located in the chassis, a plurality of fan zones located in the chassis, wherein each of the plurality of fan zones includes at least one fan, and wherein a first mapping is provided between the thermal sensor and a first fan zone of the plurality of fans zone, and a second mapping is provided between the first fan zone and a second fan zone in the plurality of fan zones, and a controller coupled to the thermal sensor and the at least one fan in each of the plurality of fan zones, wherein in response to receiving a signal from the thermal sensor, the controller is operable to activate the at least one fan in the first fan zone according to the first mapping and activate the at least one fan in the second fan zone according to the second mapping.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
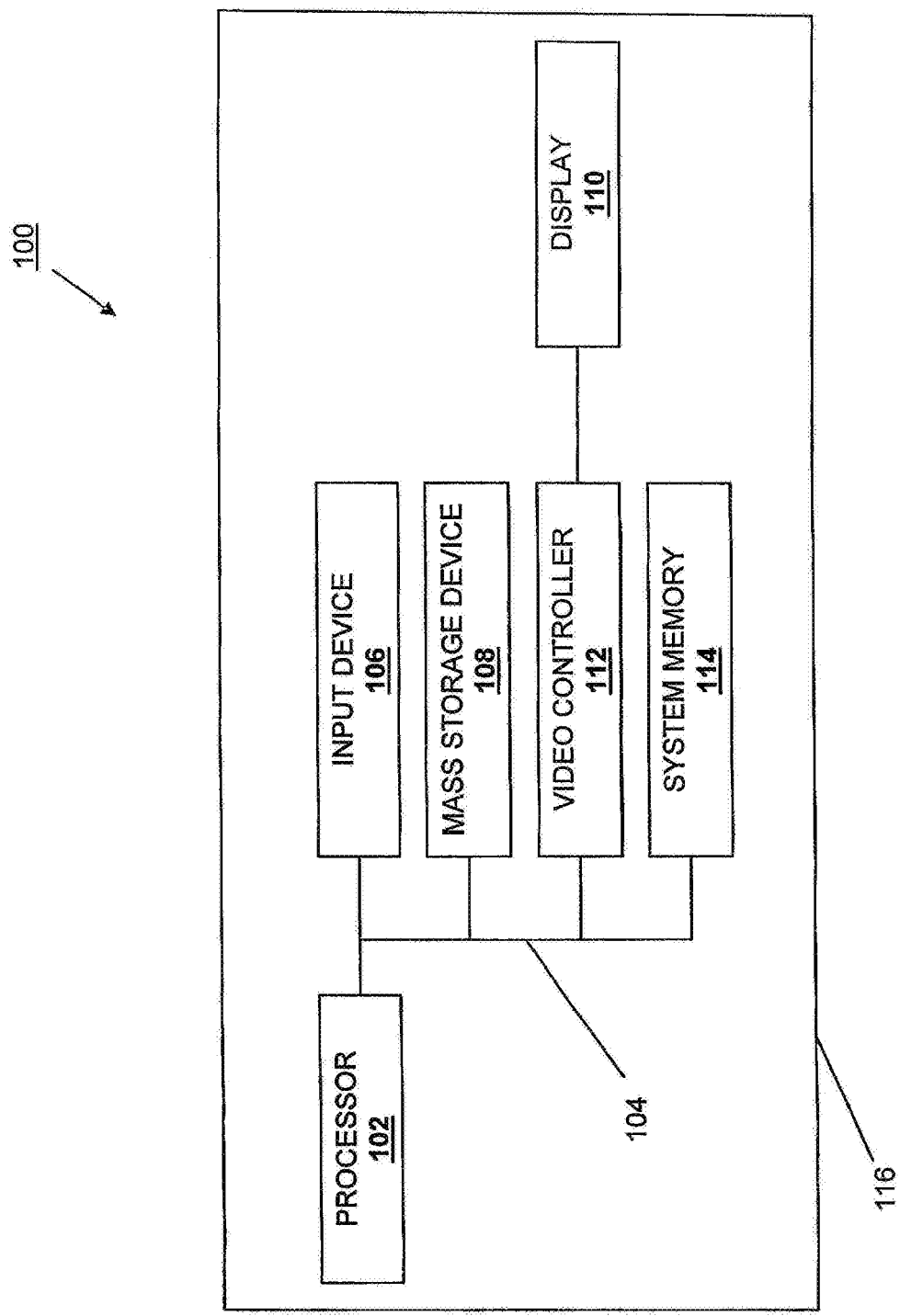
FIG. 1 is a schematic view illustrating an embodiment of an information handling system (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
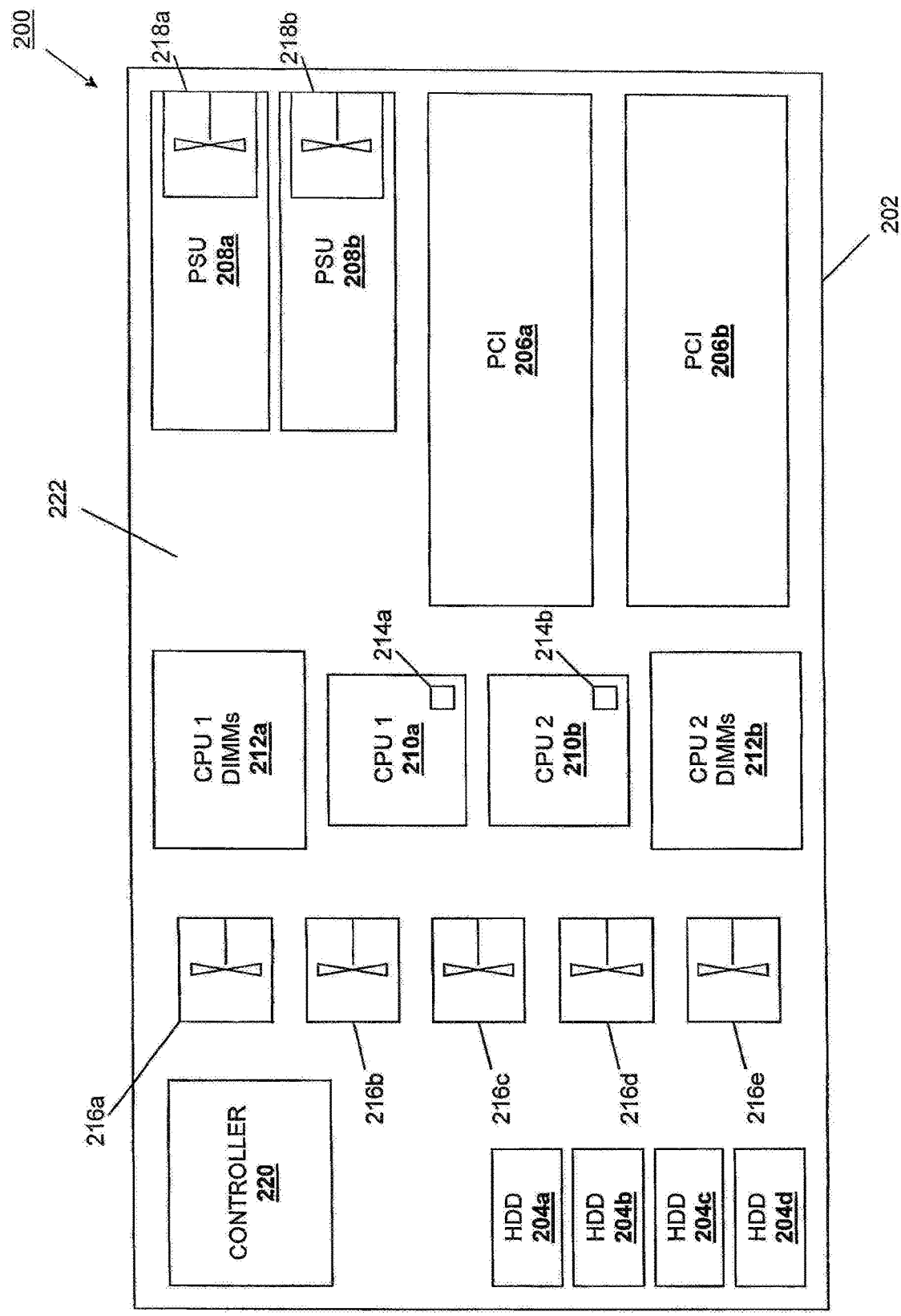
FIG. 2 is a schematic view illustrating an embodiment of a plurality of components and a plurality of fan zones in a chassis.

Referring now to FIG. 2, an embodiment of an IHS 200 is illustrated. The IHS 200 may be the IHS 100, described above with reference to FIG. 1, and may include some or all of the IHS components described above with reference to FIG. 1. The IHS 200 includes a chassis 200, which may be the chassis 116 described above with reference to FIG. 1. In the illustrated embodiment, the IHS 200 includes a plurality of IHS components such as, for example, Hard Disk Drives (HDDs) 204a, 204b, 204c, and 204d, Peripheral Component Interconnects (PCIs) 206a and 206b, Power Supply Units (PSUs) 208a and 208b, Central Processing Units (CPUs) 210a and 210b, and CPU Dual Inline Memory Modules (DIMMs) 212a and 212b. In the illustrated embodiment, each of the CPUs 210a and 210b includes a respective sensor 214a and 214b which may be a thermal sensor and/or other temperature sensor known in the art. A plurality of fan zones 216a, 216b, 216c, 216d, and 216e are located in the chassis 202 adjacent the IHS components. In the illustrated embodiment, each of the PSUs 208a and 208b includes a fan zone 218a and 218b as well. A controller 220 is located in the chassis 202 and may be coupled to any or all of the fan zones 216a, 216b, 216c, 216d, 216e, 218a, and 218b, to any of the IHS components, and/or to any portion of the IHS components (e.g., the sensors 214a and 214b) through, for example, a circuit board 222. Furthermore, any of the IHS component may be coupled together through the circuit board 222 (e.g., the CPUs 210a and 210b may be coupled to their respective CPU DIMMs 212a and 212b, the HDDs 204a, 204b, 204c, and 204d, the PCIs 206a and 206b, and/or the PSUs 208a and 208b.) While a specific IHS 200 including specific IHS components is illustrated and described, one of skill in the art will recognize that a variety of modifications may be made to the IHS 200 and/or the IHS components while remaining within the scope of the present disclosure.

In an embodiment, each fan zone (e.g., the fan zones 216a, 216b, 216c, 216d, 216e, 218a, and 218b) may include one or more fans. Thus, while the embodiment of FIG. 2 illustrates only one fan per fan zone, the present disclosure is not so limited, and any plurality of fans may be defined as a fan zone and/or included in the fan zones 216a, 216b, 216c, 216d, 216e, 218a, and/or 218b. For example, one or more fans in a particular area of the chassis may be designated a fan zone. In another example, one or more fans that affect airflow to a particular area of a chassis may be designated a fan zone. While a few examples have been provided, one of skill in the art will recognize that a wide variety of fan zone attributes will fall with the scope of the present disclosure.

Figure 3:
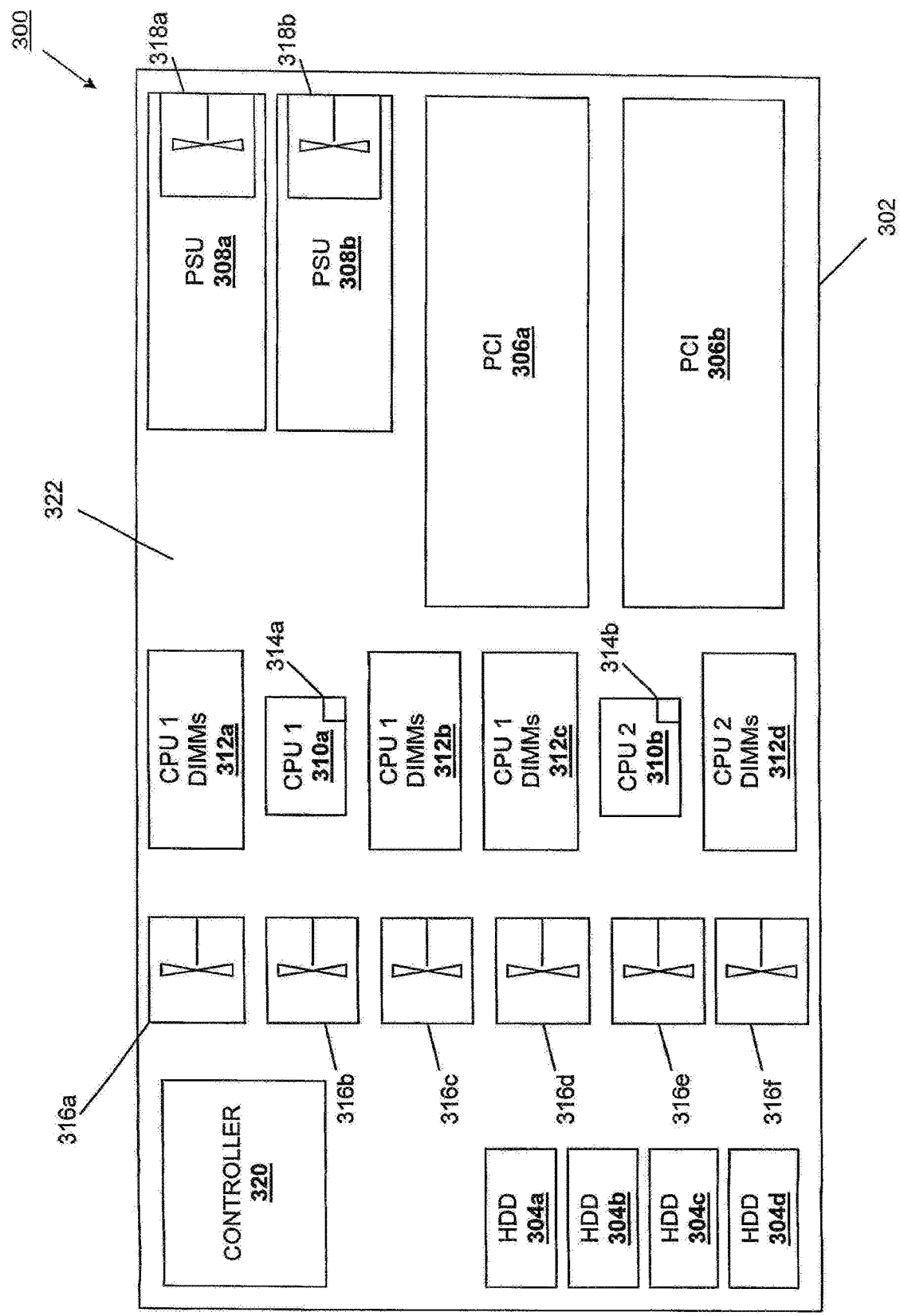
FIG. 3 is a schematic view illustrating an embodiment of a plurality of components and a plurality of fan zones in a chassis.

Referring now to FIG. 3, an embodiment of an IHS 300 is illustrated. The IHS 300 may be the IHS 100, described above with reference to FIG. 1, and may include some or all of the IHS components described above with reference to FIG. 1. The IHS 300 includes a chassis 300, which may be the chassis 116 described above with reference to FIG. 1. In the illustrated embodiment, the IHS 300 includes a plurality of IHS components such as, for example, Hard Disk Drives (HDDs) 304a, 304b, 304c, and 304d, Peripheral Component Interconnects (PCIs) 306a and 306b, Power Supply Units (PSUs) 308a and 308b, Central Processing Units (CPUs) 310a and 310b, and CPU Dual Inline Memory Modules (DIMMs) 312a, 312b, 312c, and 312d. In the illustrated embodiment, each of the CPUs 310a and 310b includes a respective sensor 314a and 314b which may be a thermal sensor and/or other temperature sensor known in the art. A plurality of fan zones 316a, 316b, 316c, 316d, 316e, and 316f are located in the chassis 302 adjacent the IHS components. In the illustrated embodiment, each of the PSUs 308a and 308b includes a fan zone 318a and 318b. A controller 320 is located in the chassis 302 and may be coupled to any of the fan zones 316a, 316b, 316c, 316d, 316e, 316f, 318a, and 318b, to any of the IHS components, and/or to any portion of the components (e.g., the sensors 314a and 314b) through, for example, a circuit board 322. Furthermore, any of the IHS component may be coupled together through the circuit board 322 (e.g., the CPUs 310a and 310b may be coupled to their respective CPU DIMMs 312a/312b and 312c/312d, the HDDs 304a, 304b, 304c, and 304d, the PCIs 306a and 306b, and/or the PSUs 308a and 308b. While a specific IHS 300 including specific IHS components is illustrated and described, one of skill in the art will recognize that a variety of modifications may be made to the IHS 300 and/or the IHS components while remaining within the scope of the present disclosure.

In an embodiment, a fan zone (e.g., the fan zones 316a, 316b, 316c, 316d, 316e, 316f, 318a, and 318b) may each include one or more fans. Thus, while the embodiment of FIG. 3 illustrates only one fan per fan zone, the disclosure is not so limited any plurality of fans may be defined as a fan zone and/or included in the fan zones 316a, 316b, 316c, 316d, 316e, 316f, 318a, and 318b. For example, one or more fans in a particular area of the chassis may be designated a fan zone. In another example, one or more fans that affect airflow to a particular area of a chassis may be designated a fan zone. While a few examples have been provided, one of skill in the art will recognize that a wide variety of fan zone attributes will fall with the scope of the present disclosure.

Figure 4A:
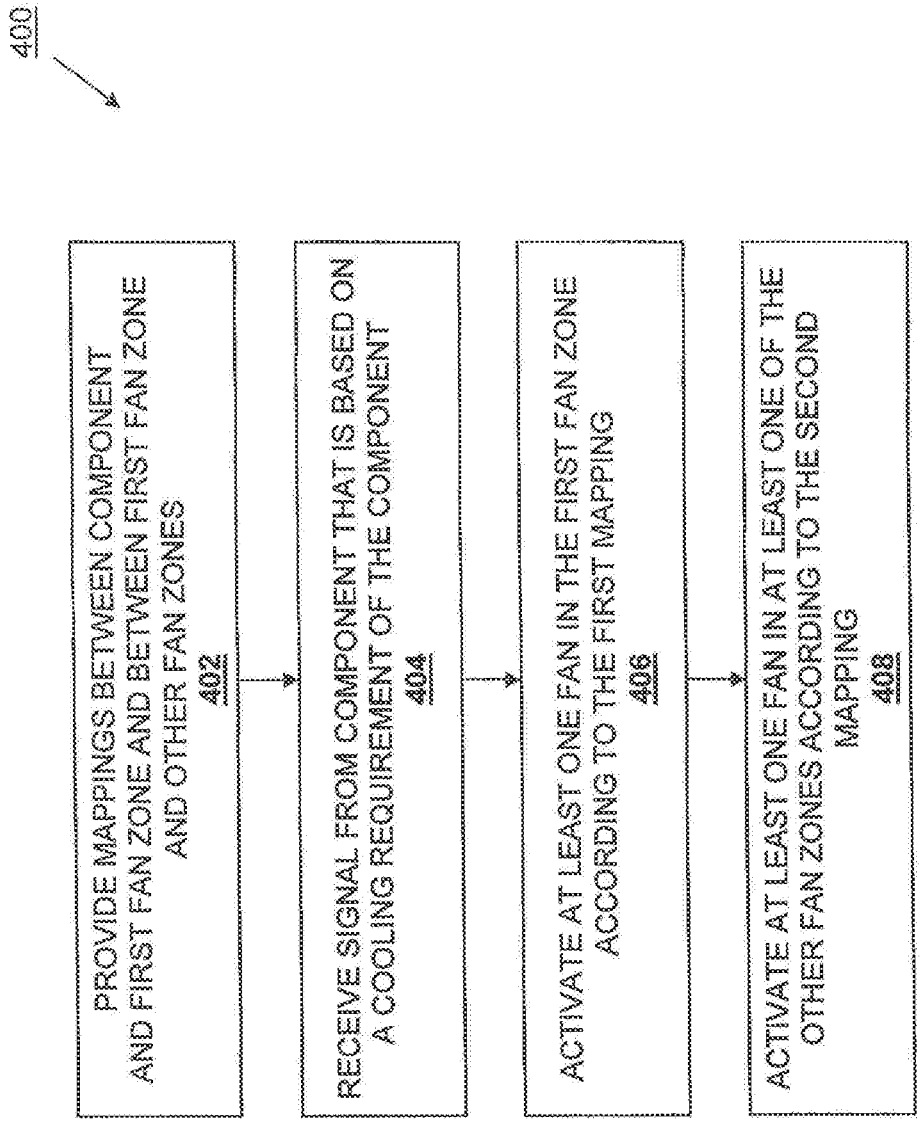
FIG. 4a is a flow chart illustrating an embodiment of a method for cooling a component.
Figure 4B:
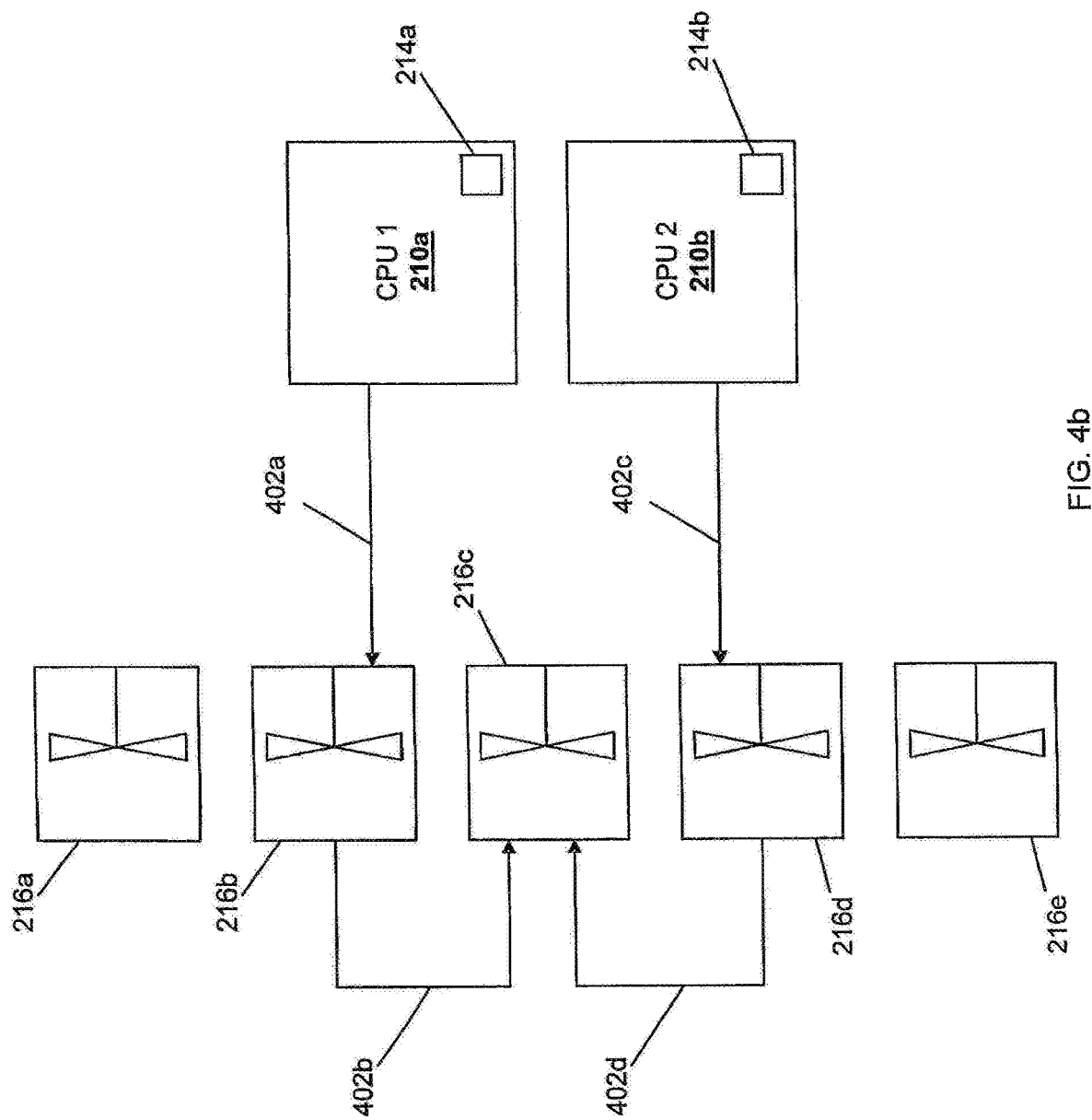
FIG. 4b is a schematic view illustrating an embodiment of a fan zone mapping configuration.
Figure 4C:
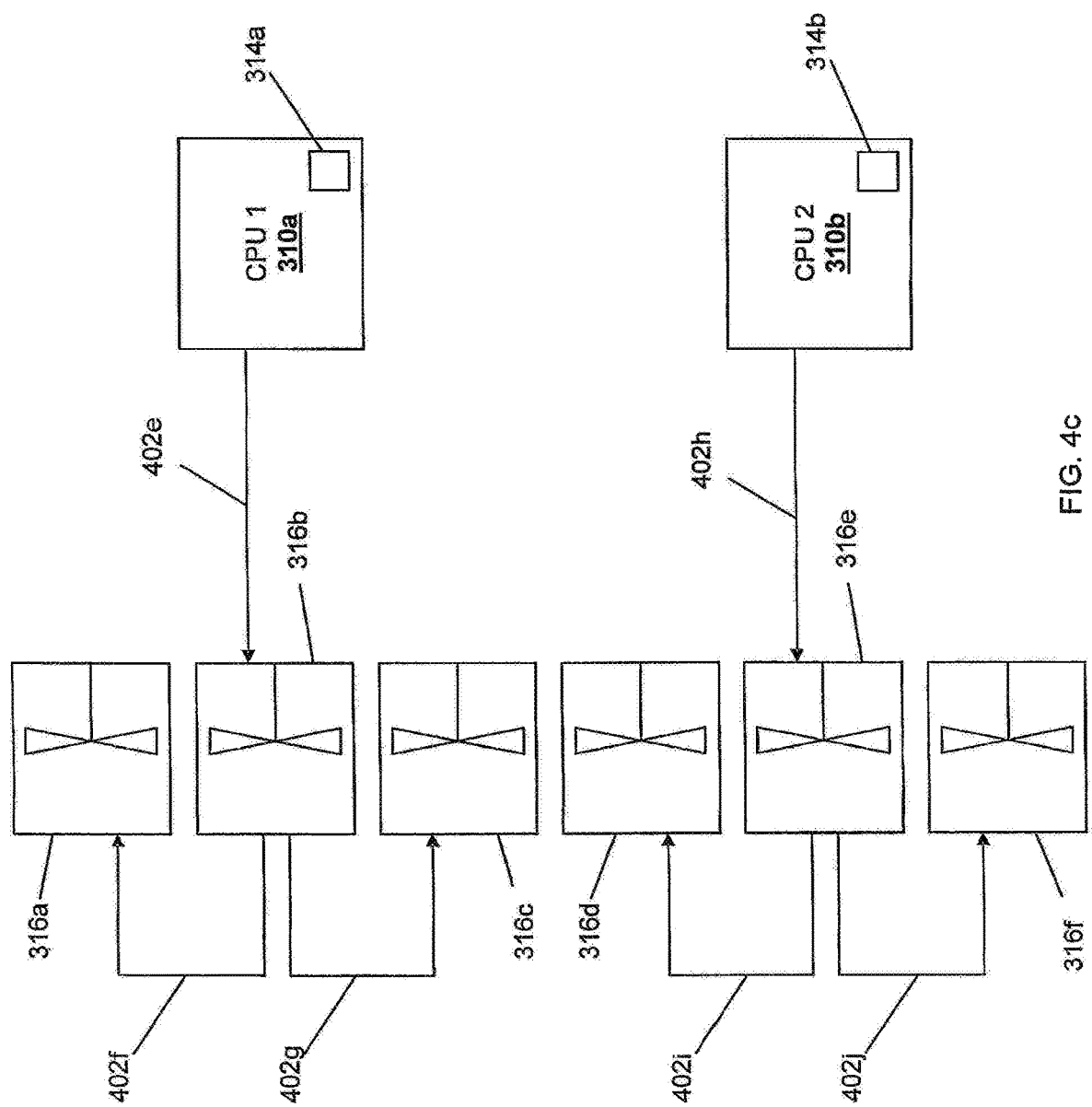
FIG. 4c is a schematic view illustrating an embodiment of a fan zone mapping configuration.

Referring now to FIGS. 2, 3, 4a, 4b, and 4c a method 400 for cooling a component is illustrated. The method 400 begins at block 402 where mappings are provided between both a component and a first fan zone and the first fan zone and an other fan zone or fan zones. In an embodiment using the IHS 200 described above with reference to FIG. 2, a first mapping 402a may be provided between the CPU 210a and the fan zone 216b, and a second mapping 402b may be provided between the fan zone 216b and the fan zone 216c, as illustrated in FIG. 4b. In another embodiment (or as part of the same embodiment), a first mapping 402c may be provided between the CPU 210b and the fan zone 216d, and a second mapping 402d may be provided between the fan zone 216d and the fan zone 216c, as illustrated in FIG. 4b. The mappings may describe an association and/or other relationship between the entities being mapped. Thus, the first mapping 402a between the CPU 210a and the fan zone 216b and/or the first mapping 402c between the CPU 210b and the fan zone 216d may describe the desired operating characteristics of the fan zones 216b and 216d in response to signals that are received from the sensors 214a and 214b (e.g., by the controller 220) and that are indicative of the cooling requirements of the CPUs 210a and 210b, respectively. Furthermore, the second mapping 402b between the fan zone 216b and the fan zone 216c and/or the second mapping 402d between the fan zone 216d and the fan zone 216c may describe the desired operating characteristics of the fan zone 216c in response to the operation of the fan zones 216b and/or 216d.

In an embodiment using the IHS 300 described above with reference to FIG. 3, a first mapping 402e may be provided between the CPU 310a and the fan zone 316b, a second mapping 402f may be provided between the fan zone 316b and the fan zone 316a, and a third mapping 402g may be provided between the fan zone 316b and the fan zone 316c. In another embodiment (or as part of the same embodiment), a first mapping 402h may be provided between the CPU 310b and the fan zone 316e, a second mapping 402i may be provided between the fan zone 316e and the fan zone 316d, and a third mapping 402j may be provided between the fan zone 316e and the fan zone 316f. The mappings may describe an association and/or other relationship between the entities being mapped. Thus, the first mapping 402e between the CPU 310a and the fan zone 316b and/or the first mapping 402h between the CPU 310b and the fan zone 316e may describe the desired operating characteristics of the fan zones 316b and 316e in response to signals that are received from the sensors 314a and 314b (e.g., by the controller 220) that are indicative of the cooling requirements of the CPUs 310a and 310b, respectively. Furthermore, the second mapping 402f between the fan zone 316b and the fan zone 316a and the third mapping 402g between the fan zone 316b and the fan zone 316c may describe the desired operating characteristics of the fan zones 316a and 316c in response to the operation of the fan zone 316b, while the second mapping 402i between the fan zone 316e and the fan zone 316d and the third mapping 402j between the fan zone 316e and the fan zone 316f may describe the desired operating characteristics of the fan zones 316d and 316f in response to the operation of the fan zone 316e.

Figure 5:
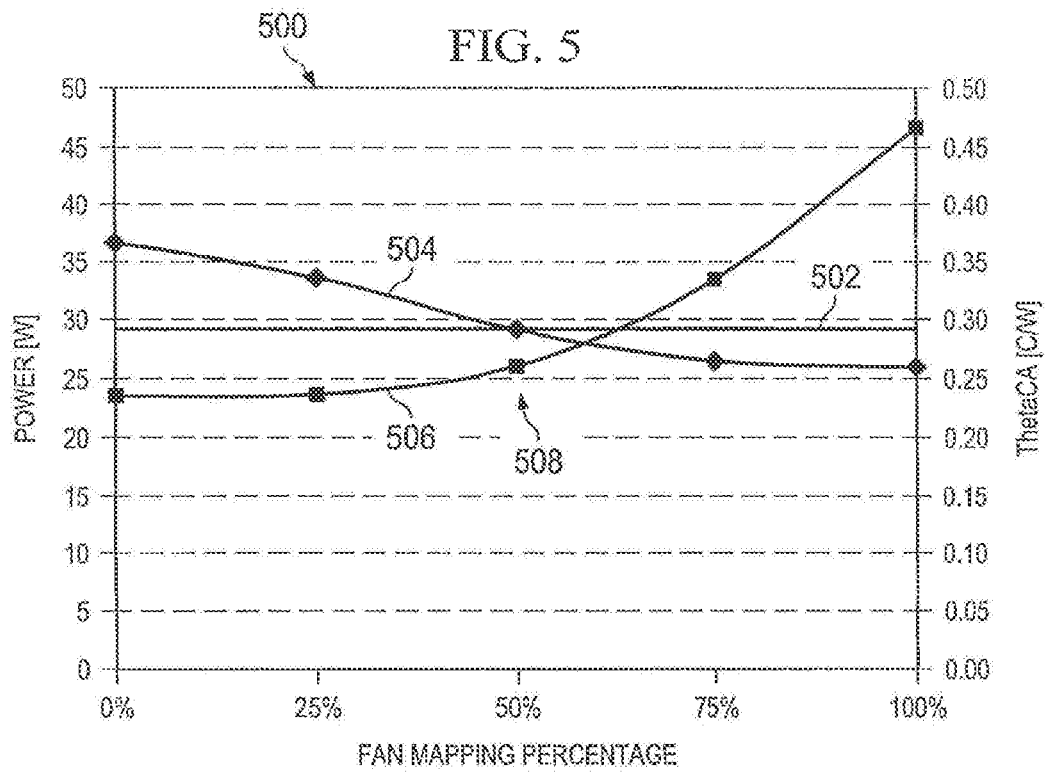
FIG. 5 is a graph illustrating an embodiment of the optimization of power consumption of a first fan zone and a second fan zone when satisfying a cooling requirement of a component.

In an embodiment, the mappings between an IHS component and fan zone(s) and/or between fan zone(s) and other fan zone(s) are selected to ensure that the cooling requirements of the IHS component are provided and/or to minimize the power consumption of the fan zones that are used to cool the IHS component. In an embodiment, the power consumption of the fan zones may be minimized as a function of the cooling requirement of the IHS component. In one embodiment, a first fan zone may include a first fan that may be driven (e.g., by a controller) at between 0% and 100% of its maximum fan speed based on the cooling requirements of the IHS component (e.g., based on the signal received from a sensor in the IHS component), and a second fan zone may include a second fan that that may be driven at some percentage of the first fan. For example, FIG. 5 is a graph 500 of an experimental embodiment in which an IHS component was mapped to a first fan (e.g., a first fan zone) and the first fan was mapped to a second fan (e.g., a second fan zone). The graph 500 includes the total power consumption (in Watts (W)) of the first fan and the second fan on the left Y-axis, the case-to-ambient/package-to-ambient thermal resistance (ThetaCA in C/W) on the right Y-axis, and the percentage of the first fans operation (e.g., the first fans speed) at which the second fan was driven on the X-axis. The graph 500 includes a line 502 illustrating the required performance of a heat sink that was thermally coupled to the IHS component, which in the experimental embodiment was approximately 0.29 C/W. The graph 500 also includes a line 504 illustrating the actual heat sink thermal performance, and a line 506 illustrating the total power consumption of the first fan and the second fan. As can be seen from the graph 500, as the percentage of the first fans operation at which the second fan was driven was increased, the actual heat sink thermal performance (line 504) dropped from approximately 0.36 C/W to 0.26 approximately C/W, while the power consumption of the first fan and the second fan (line 506) increased from approximately 24 W to approximately 47 W. One of skill in the art will recognize that when the actual heat sink performance (line 504) on the graph 500 dropped below the required heat sink performance (line 502) at point 508 on the graph 500, the cooling requirements of the component are provided, and thus the second fan should be driven at approximately 50% of the speed of the first fan to minimize the power consumption of the first fan and the second fan while ensuring the cooling requirements of the IHS component are provided.

While examples have been provided that include a first mapping (between the IHS component and a first fan zone) and a second mapping (between the first fan zone and a second fan zone), or a first mapping (between the IHS component and a first fan zone), a second mapping (between the first fan zone and a second fan zone), and third mapping (between the first fan zone and a third fan zone), one of skill in the art will recognize that a variety of different mapping configurations may be provided depending on the IHS components, the chassis, the airflow characteristics of the system, and/or a variety of other cooling considerations known in the art. Furthermore, while a second mapping and a third mapping that include driving a second fan zone and a third fan zone at a percentage of the first fan zone has been described, a variety of other mapping techniques are envisioned as falling within the scope of the present disclosure. For example, second, third, and/or other mappings may be provided between the IHS component and the second, third, or other fan zones (rather than between first fan zone and the second, third, or other fan zones.) In another embodiment, a third fan zone may be mapped to a second fan zone, a fourth fan zone may be mapped to the third fan zone, etc. In another example, mappings may utilize any functions that are found to provide appropriate cooling such as, for example, exponential functions (e.g., the second fan zone is driven according to an exponential function that includes, for example, a speed of a fan in the first fan zone as a variable) and/or other functions known in the art. In another example, a mapping may offset fan zones from each other such that a fan in a second fan zone is only driven only once a fan in a first fan zone reaches a predetermined fan speed. Furthermore, combinations of the above examples that result in a fan in a second fan zone being driven at a percentage of a fan in the first fan zone only once the fan in the first fan zone reaches a predetermined fan speed may be beneficial.

The method 400 then proceeds to block 404 where a signal is received from the component that is based on a cooling requirement of the component. As is known in the art, as IHS components operate, heat is generated in the IHS components that must be dissipated. In one example, as the CPUs 210a, 210b, 310a, and/or 310b operate and generate heat, their respective sensors 214a, 214b, 314a, and/or 314b may generate signals based on the cooling requirements necessary to dissipate that heat. Those signals may be sent to, retrieved by, and/or otherwise received by the controllers 220 and/or 320.

The method 400 then proceeds to blocks 406 and 408 where at least one fan in a first fan zone is activated according to a first mapping and at least one fan in an other fan zone is activated according to a second mapping. In one embodiment, the controller 220 receives the signal from the sensor 214a in the CPU 210a and, in response, activates at least one fan in the fan zone 216b according to the first mapping 402a and activates at least one fan in the fan zone 216c according to the second mapping 402b. In another embodiment, the controller 220 receives the signal from the sensor 214b in the CPU 210b and, in response, activates at least one fan in the fan zone 216d according to the first mapping 402c and activates at least one fan in the fan zone 216c according to the second mapping 402b. In one example of these embodiments, the first mappings 402a or 402c and/or the second mappings 402b or 402d may be "direct" mappings in which the first mappings cause the controller 220 to activate the fan(s) in the fan zones 216b or 216d in order to operate those fan(s) based on the signals from the sensors 214a and/or 214b, while the second mappings cause the controller 220 to activate the fans in the fan zone 216c based directly on the activation of the fan(s) in the fan zones 216b or 216d (e.g., if the fan(s) in the fan zones 216b or 216d are driven at X rotations per minute (RPMs), then the fan(s) in the fan zone 216c will be driven at X RPMs). In another example of these embodiments, the first mappings 402a or 402c and/or the second mappings 402b or 402d may be "weighted" or "function" mappings in which the first mappings cause the controller 220 to activate the fan(s) in the fan zones 216b or 216d to operate those fan(s) at some percentage of their maximum speed based on the signals from the sensors 214a and/or 214b, while the second mappings cause the controller 220 to activate the fans in the fan zone 216c based on some function of the operation of the fan(s) in the fan zones 216b or 216d (e.g., if the fan(s) in the fan zones 216b or 216d are driven at X rotations per minute (RPMs), then the fan(s) in the fan zone 216c may be driven at A*X RPMs or A*X+C RPMs, where A is a "weighted" function such as a percentage, an exponential function, etc., and C is a constant that may provide an offset).

In another embodiment, the controller 220 may receive the signals from both the sensors 214a and 214b in the CPU's 210a and 210b, respectively, and, in response, operate at least one fan in each of the fan zones 216b and 216d according to the first mappings 402a and 402c. Furthermore, in that example, at least one fan in the fan zone 216c may be operated according to the second mappings 402b and 402d that requires a higher fan speed (i.e., such that the cooling requirements of the CPU that requires that higher fan speed is ensured.) As discussed above, the first and second mappings may be "direct" mappings, "weighted" or "function" mappings, and/or a variety of other mappings known in the art.

In another embodiment, the controller 320 receives the signal from the sensor 314a in the CPU 310a and, in response, activates at least one fan in the fan zone 316b according to the first mapping 402e, activates at least one fan in the fan zone 316a according to the second mapping 402f, and activates at least one fan in the fan zone 316c according to the third mapping 402g. In another embodiment, the controller 320 receives the signal from the sensor 314b in the CPU 310b and, in response, activates at least one fan in the fan zone 316e according to the first mapping 402h, activates at least one fan in the fan zone 316d according to the second mapping 402i, and activates at least one fan in the fan zone 316f according to the third mapping 402j. As discussed above with the first and second mappings, the first, second, or third mappings in these embodiments may be "direct" mappings, "weighted" or "function" mappings, and/or a variety of other mappings known in the art. For example, the second mappings 402f and 402i to the fan zones 316a and 316d, respectively, may be 50% of the fan speed of the fan zones 316b and 316e, respectively, and the third mappings 402g and 402j to the fan zones 316c and 316f, respectively, may be 33% of the fan speed of the fan zones 316b and 316e. In this example, the fan zones 316b and 316e would be activated to operate at some percentage of their maximum speed based on the signal and the first mappings 402e and 402h, while the fan zones 316a and 316d would be activated to be driven at half the speed of the fan zones 316b and 316e, respectively, and the fan zones 316c and 316f would be activated to be driven at one-third the speed of the fan zones 316b and 316e, respectively.

Figure 6:
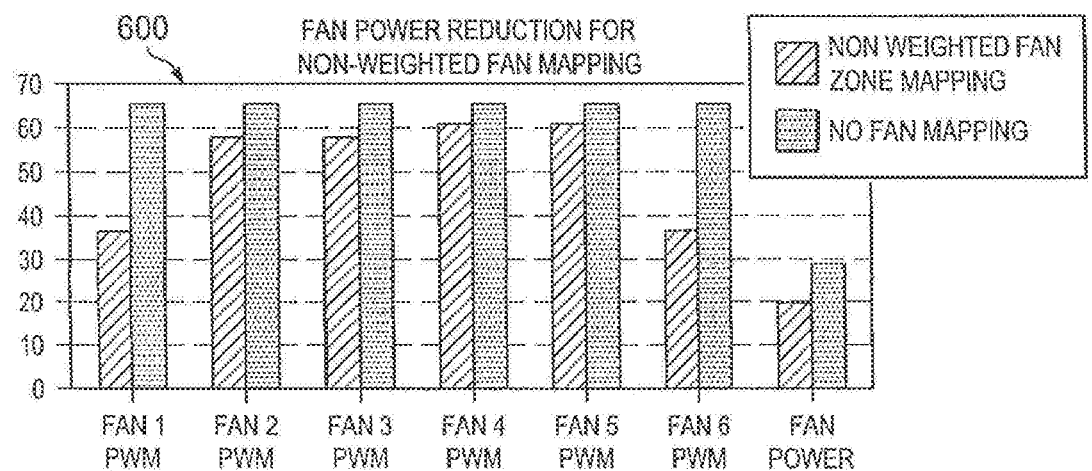
FIG. 6 is a graph illustrating an experimental embodiment of power savings provided using non-weighted fan zone mapping.

Referring now to FIG. 6, in an experimental embodiment 600 a six fan zone system with one fan per fan zone was tested both with "direct" mapping and without mapping in order to determine the power consumption of the fans when providing the same amount of cooling. As can be seen, with direct mapping, each of the fans 1-6 consumed less power than when no mapping was provided (see the first six bar graph comparisons starting from the left of the graph), and the total power consumption of the fans was reduced with the direct mapping relative to when no mapping was provided (see the bar graph comparison on the far right of the graph). Furthermore, with "weighted" or "function" mapping, further power consumption savings can be realized. For example, because fan power consumption is a cubic of fan speed, airflow as a function of fan power consumption can be minimized in most cases by increasing the fan speeds in "secondary" fan zones that are adjacent a "primary" fan zone to which a component is directly mapped (e.g., to some percentage of the fan speed of the fan in the primary fan zone), which provides power savings relative to simply speeding up the fans in the primary fan zone. Furthermore, the cubic relationship of fan power consumption to fan speed allows the total fan zone power consumption across the system to be reduced even with increased fan speeds in secondary fan zones (due to the reduction in maximum fan speeds). With fan power consuming up to 20% of the total power consumed by an IHS, such power savings can provide substantial benefits for any IHS.

Another benefit that may be realized with the fan zone mapping of the present disclosure relates to system acoustics. System acoustic response or "sound power" is a fifth order of fan speed, and thus the reductions of the maximum speeds of the fans across the fan zones will provide a reduced acoustic response in the system even when some fans in particular fan zones have their speeds increased.

Furthermore, in extreme conditions, the "primary" fan zone that is mapped directly to the component may be "driven" beyond 100% by the controller in order to bring the secondary fan zones that are mapped the primary fan zone up to their maximum speed. For example, a controller may receive a signal that brings the fan in the primary fan zone to 100% of its maximum speed, and the secondary fan zones may be mapped to the primary fan zone such that the fans in the secondary fan zones are driven at some percentage of the speed of the fan in the primary fan zone. In response to a signal from the component that indicates that the component needs more cooling, the controller may "drive" the primary fan zone above 100% of its maximum speed in order to increase the speed of the fans in the secondary fan zones. In such a situation, the fan in the primary fan zone will not actually have its speed increased (as it is already operating at its maximum speed), but as a result of the controller "driving" the primary fan zone above 100% of its maximum speed, the fans in the secondary fan zones may be driven faster in order to provide more cooling to the component. Furthermore, the "driving" of the primary fan zone above its maximum speed may be performed to "drive" some secondary fan zones above their maximum speeds until all fan zones are operating at maximum speed, if necessary to ensure that the cooling requirements of the component are provided.

Figure 7:
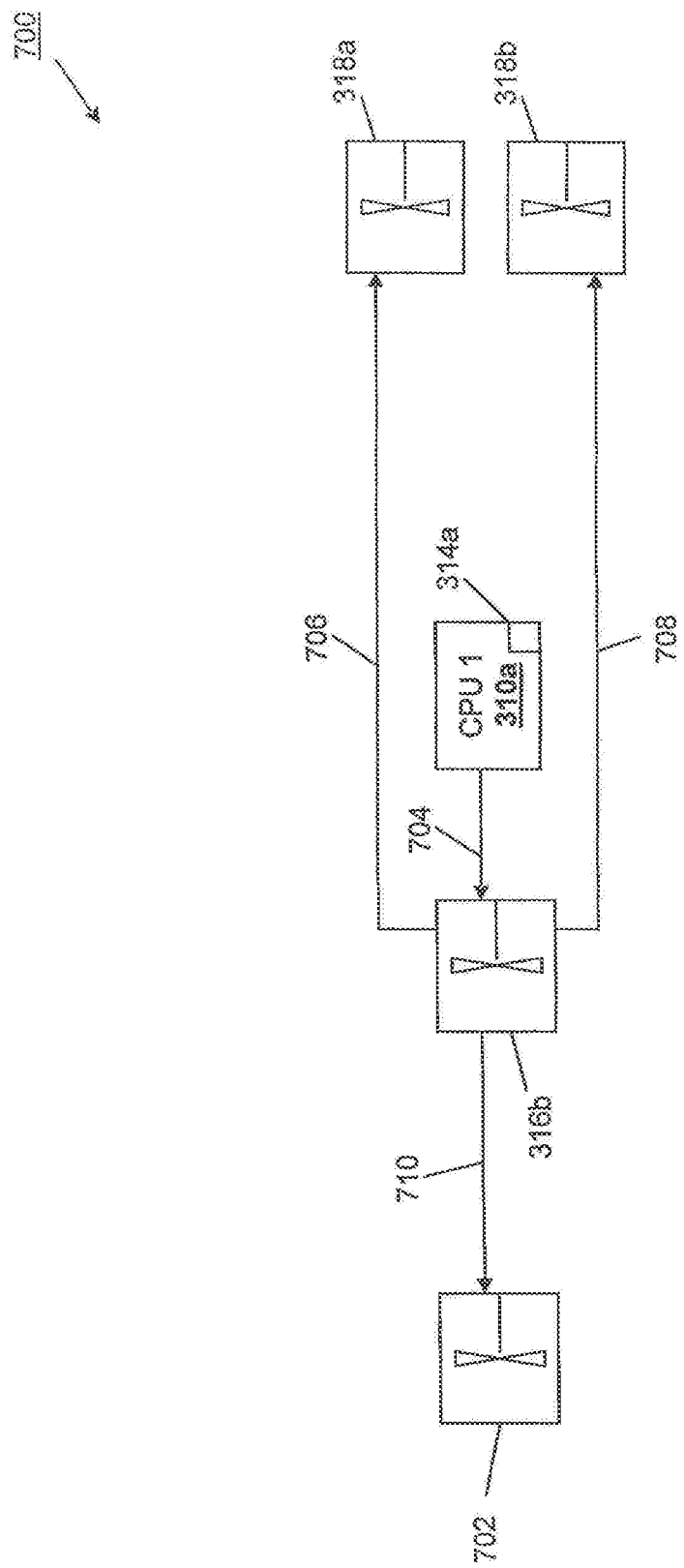
FIG. 7 is a schematic view illustrating an embodiment of a fan zone mapping configuration.

Referring now to FIG. 7, an alternative embodiment of a fan zone mapping configuration 700 is illustrated that includes several of the elements of the IHS 300 in FIG. 3 including the CPU 310a, the sensor 314a, and the fan zones 316b, 318a, and 318b. The fan zone mapping configuration 700 also includes an additional fan zone 702. The embodiment of the fan zone mapping configuration 700 illustrates a "series" configuration of the fan zones that is meant to contrast the "parallel" configuration of fan zones illustrated in FIGS. 4b and 4c. Similarly as discussed above, mappings may be provided between the CPU 310a and the fan zones 316b, 318a, 318b, and 702. For example, a first mapping 704 is provided between the CPU 310a (or its sensor 314a) and the fan zone 316b, a second mapping 706 is provided between the fan zones 316b and 318a, a third mapping 708 is provided between the fan zones 316b and 318b, and a fourth mapping 710 is provided between the fan zones 316b and 702. It has been found that fan zones in a series configuration like that illustrated in FIG. 7b can cause changes in airflow balance in regions of the IHS chassis, and can cause negative, positive, or stagnant airflow depending on the fan speed differences of the fan(s) in the fan zones. However, with the mappings 704, 706, 708, and 710, the fan zones 316b, 318a, 318b, and 702 can be "tuned" such that the airflow provided to the CPU 310a ensures that the cooling requirements of the CPU are provided while consuming a minimum amount of power. For example, in response to a signal from the sensor 314a that is indicative of a cooling requirement of the CPU 310a, the controller 320 may activate the fan zones 316b, 318a, 318b, and 702 to operate the fan zone 316b at maximum speed, the fan zone 318a at 20% the speed of fan zone 316b, the fan zone 318b at 20% the speed of fan zone 316b, and the fan zone 702 at 50% the speed of fan zone 316b once the fan zone 316b has reached 50% its maximum speed. One of skill in the art will recognize that the mappings 704, 706, 708, and 710 may be modified as discussed above to provide the cooling requirements of any IHS component, and combinations of "parallel" and "series" fan zone configurations may include mappings to ensure proper cooling to all IHS components in an IHS.

Thus, a system and method have been described that allow a plurality of fan zones to be mapped to a component and/or each other in order to allow the plurality of fan zones to operate in cooperation to ensure that the cooling requirements of the component are provided while consuming the minimum amount of power. In an embodiment, a first fan zone is mapped to the component, and other fan zones are mapped to the first fan zone such that the fans in the other fan zones operate at a percentage of the fan in the first fan zone and/or operate at an offset of the fan speed of the fan in the first fan zone. In experimental embodiments, the mapping of multiple fan zones to an IHS components has been found to provide proper cooling to IHS components at minimal power consumption. Furthermore, one of skill in the art will recognize that the fan zone mapping of the present disclosure provides the ability to "tune" the cooling system of any IHS (e.g., through testing of those IHSs) such that the fan zones ensure proper cooling of IHS components, consume a minimum amount of power, and ensure that airflow conflicts between fan zones do not exist.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A cooling system, comprising:
a chassis;
a controller;
a thermal sensor located in the chassis and coupled to the controller; and
a plurality of fan zones located in the chassis and coupled to the controller, wherein each of the plurality of fan zones includes at least one fan, and wherein the controller includes:
a first mapping between the thermal sensor and a first fan zone of the plurality of fan zones that provides for operation of the at least one fan in the first fan zone at a first operation characteristic in direct response to thermal data received from the thermal sensor; and
a second mapping between the first fan zone and a second fan zone in the plurality of fan zones that provides for operation of the at least one fan in the second fan zone at a second operation characteristic in direct response to the operation of the at least one fan in the first fan zone at the first operation characteristic;
wherein the first operation characteristic is different than the second operation characteristic;
wherein a linked operation of the at least one fan in the first fan zone at the first operation characteristic and the at least one fan in the second fan zone at the second operation characteristic provides for the cooling requirements of at least one component associated with the thermal sensor while minimizing a system acoustic response that results from fan operation; and
wherein in response to receiving a signal from the thermal sensor, the controller is configured to activate the at least one fan in the first fan zone accord- ing to the first mapping such that the at least one fan in the first fan zone operates according to the first operation characteristic, and in response to the operation of the at least one fan in the first fan zone at the first operation characteristic, the controller is configured to activate the at least one fan in the second fan zone according to the second mapping such that the at least one fan in the second fan zone operates according to the second operation characteristic.

2. The system of claim 1, wherein the thermal sensor is coupled to the at least one component and the signal from the thermal sensor is related to the cooling requirements of the at least one component.

3. The system of claim 1, wherein the second operation characteristic of the at least one fan in the second fan zone provides for a reduced operating level of the at least one fan in the second fan zone relative to the operating level of the at least one fan in the first fan zone when operating at the first operation characteristic.

4. The system of claim 3, wherein the reduced operating level of the at least one fan in the second fan zone includes a reduced fan speed of the at least one fan in the second fan zone relative to the fan speed of the at least one fan in the first fan zone when operating at the first operation characteristic.

5. The system of claim 1, wherein the second operation characteristic is a function of the first operation characteristic, wherein the function includes a percentage of the first operation characteristic.

6. The system of claim 1, wherein the controller is configured to activate the at least one fan in the second fan zone only according to the second mapping such that the at least one fan in the second fan zone operates only according to the second operation characteristic.

7. The system of claim 1, wherein the controller includes a third mapping that provides for operation of at least one fan in a third fan zone at a third operation characteristic in direct response to at least one of the operation of the at least one fan in the first fan zone at the first operation characteristic and the operation of the at least one fan in the second fan zone at the second operation characteristic;

wherein the first operation characteristic is different than the third operation characteristic;

wherein a linked operation of the at least one fan in the first fan zone at first operation characteristic, the at least one fan in the second fan zone at the second operation characteristic, and the at least one fan in the third fan zone at the third operation characteristic provides for the cooling requirements of at least one component associated with the thermal sensor while minimizing the acoustic response that results from fan operation; and wherein in response to receiving the signal from the thermal sensor, the controller is configured to activate the at least one fan in the third fan zone according to the third mapping such that the at least one fan in the third fan zone operates according to the third operation characteristic while the at least one fan in the first fan zone operates according to the first operation characteristic and the at least one fan in the second fan zone operates according to the second operation characteristic.

8. The system of claim 7, wherein the third operation characteristic is a function of at least one of the first operation characteristic and the second operation characteristic.

9. An information handling system (IHS), comprising:
a controller;
a plurality of IHS components coupled to the controller, wherein the plurality of IHS components include at least one processor and at least one memory coupled to the at least one processor; and
a plurality of fan zones located adjacent the plurality of IHS components and coupled to the controller, wherein each of the plurality of fan zones includes at least one fan, and wherein the controller includes:
a first mapping between a first IHS component of the plurality of IHS components and a first fan zone of the plurality of fan zones that provides for operation of the at least one fan in the first fan zone at a first operation characteristic in direct response to cooling requirements of the first IHS component; and
a second mapping between the first fan zone and a second fan zone in the plurality of fan zones that provides for operation of the at least one fan in the second fan zone at a second operation characteristic in direct response to the operation of the at least one fan in the first fan zone at the first operation characteristic;
wherein the first operation characteristic is different than the second operation characteristic;
wherein a linked operation of the at least one fan in the first fan zone at the first operation characteristic and the at least one fan in the second fan zone at the second operation characteristics provides for the cooling requirements of the first IHS component while minimizing the acoustic response that results from fan operation;
wherein in response to receiving a signal from the first IHS component, the controller is configured to activate the at least one fan in the first fan zone according to the first mapping such that the at least one fan in the first fan zone operates according to the first operation characteristic, and in response to the operation of the at least one fan in the first fan zone at the first operation characteristic, the controller is configured to activate the at least one fan in the second fan zone according to the second mapping such that the at least one fan in the second fan zone operates according to the second operation characteristic.

10. The IHS of claim 9, further comprising:
an IHS chassis that houses the plurality of IHS components and the plurality of fan zones.

11. The IHS of claim 9, wherein the first IHS component includes a temperature sensor that sends the signal to the controller based on the cooling requirements of the first IHS component.

12. The IHS of claim 9, wherein the second operation characteristic of the at least one fan in the second fan zone provides for a reduced operating level of the at least one fan in the second fan zone relative to the operating level of the at least one fan in the first fan zone when operating at the first operation characteristic.

13. The IHS of claim 9, wherein the reduced operating level of the at least one fan in the second fan zone includes a reduced fan speed of the at least one fan in the second fan zone relative to the fan speed of the at least one fan in the first fan zone when operating at the first operation characteristic.

14. The IHS of claim 9, wherein the second operation characteristic is a function of the first operation characteristic.

15. The IHS of claim 14, wherein the function includes at least one of a percentage, an offset, and combinations thereof.

16. The IHS of claim 9, wherein the controller includes:
a third mapping that provides for operation of at least one fan in a third fan zone at a third operation characteristic in direct response to at least one of the operation of the at least one fan in the first fan zone at the first operation characteristic and the operation of the at least one fan in the second fan zone at the second operation characteristic;
wherein the first operation characteristic is different than the third operation characteristic;
wherein a linked operation of the at least one fan in the first fan zone at the first operation characteristic, the at least one fan in the second fan zone at the second operation characteristic, and the at least one fan in the third fan zone at the third operation characteristic provides for the cooling requirements of first IHS component while minimizing the acoustic response that results from fan operation; and
wherein in response to receiving the signal from the first IHS component, the controller is configured to activate the at least one fan in the third fan zone according to the third mapping such that the at least one fan in the third fan zone operates according to the third operation characteristic while the at least one fan in the first fan zone operates according to the first operation characteristic and the at least one fan in the second fan zone operates according to the second operation characteristic.

17. The IHS of claim 16, wherein the third operation characteristic is a function of at least one of the first operation characteristic and the second operation characteristic.

18. A method for cooling a component, comprising:
receiving, by a controller, a signal that is related to the cooling requirements of a component;
activating, by the controller in response to receiving the signal, at least one fan in a first fan zone according to a first mapping between the component and the first fan zone that provides for operation of at least one fan in the first fan zone at a first operation characteristic in direct response to cooling requirements of the component; and
activating, by the controller, at least one fan in a second fan zone according to a second mapping between the first fan zone and the second fan zone that provides for operation of at least one fan in the second fan zone at a second operation characteristic in direct response to operation of the at least one fan in the first fan zone at the first operation characteristic;
wherein the first operation characteristic is different than the second operation characteristic; and
wherein a linked operation of the at least one fan in the first fan zone at the first operation characteristic and the at least one fan in the first fan zone at the second operation characteristic provides for the cooling requirements of the component while minimizing the acoustic response that results from fan operation.

19. The method of claim 18, further comprising:
activating, by the controller, at least one fan in a third fan zone according to a third mapping between the first fan zone and a third fan zone that provides for operation of at least one fan in a third fan zone at a third operation characteristic in direct response to at least one of the operation of the at least one fan in the first fan zone at the first operation characteristic and the operation of the at least one fan in the second fan zone at the second operation characteristic;
wherein the first operation characteristic is different than the third operation characteristic; and
wherein a linked operation of the at least one fan in the first fan zone at the first operation characteristic, the at least one fan in the second fan zone at the second operation characteristic, and the at least one fan in the third fan zone at the third operation characteristic provides for the cooling requirements of the component while minimizing the acoustic response that results from fan operation.

20. The method of claim 18, wherein the second operation characteristic provides for a reduced fan speed of the at least one fan in the second fan zone relative to the fan speed of the at least one fan in the first fan zone when operating at the first operation characteristic.

* * * * *